No. 764,486. PATENTED JULY 5, 1904.
G. MOORE.
FILTERING PROCESS.
APPLICATION FILED OCT. 30, 1902. RENEWED FEB. 3, 1904.
NO MODEL. 2 SHEETS—SHEET 1.
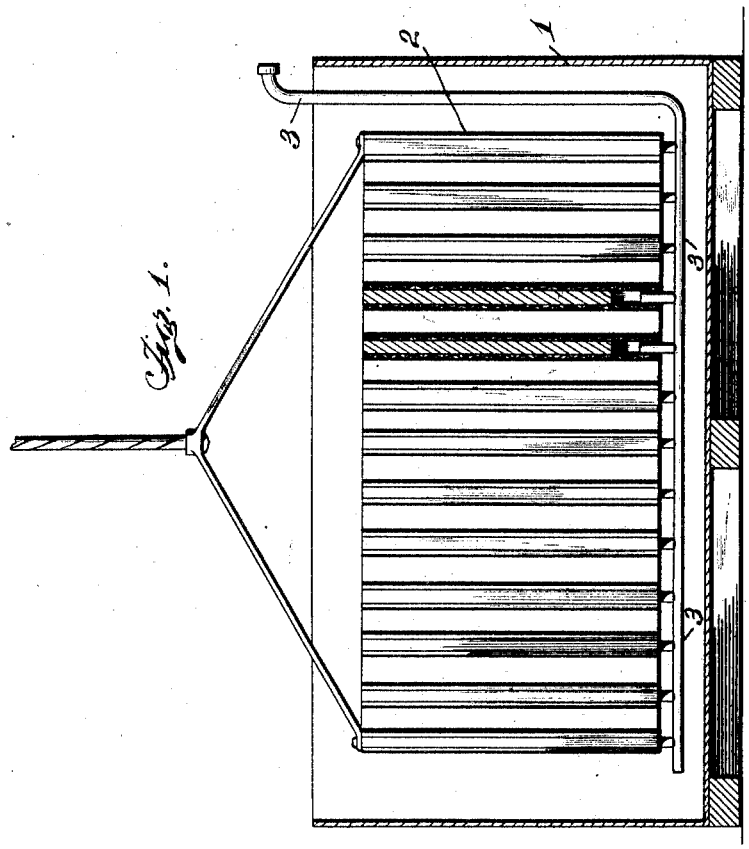
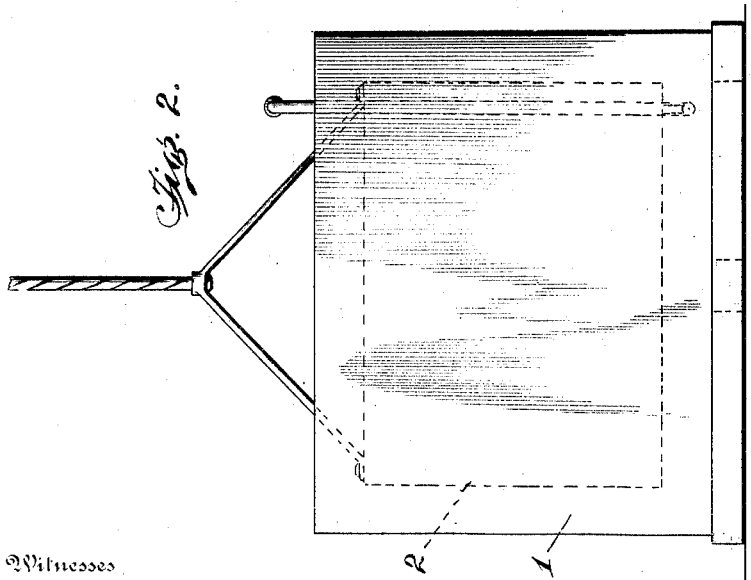

No. 764,486. PATENTED JULY 5, 1904.
G. MOORE.
FILTERING PROCESS.
APPLICATION FILED OCT. 30, 1902. RENEWED FEB. 3, 1904.
NO MODEL. 2 SHEETS—SHEET 2.
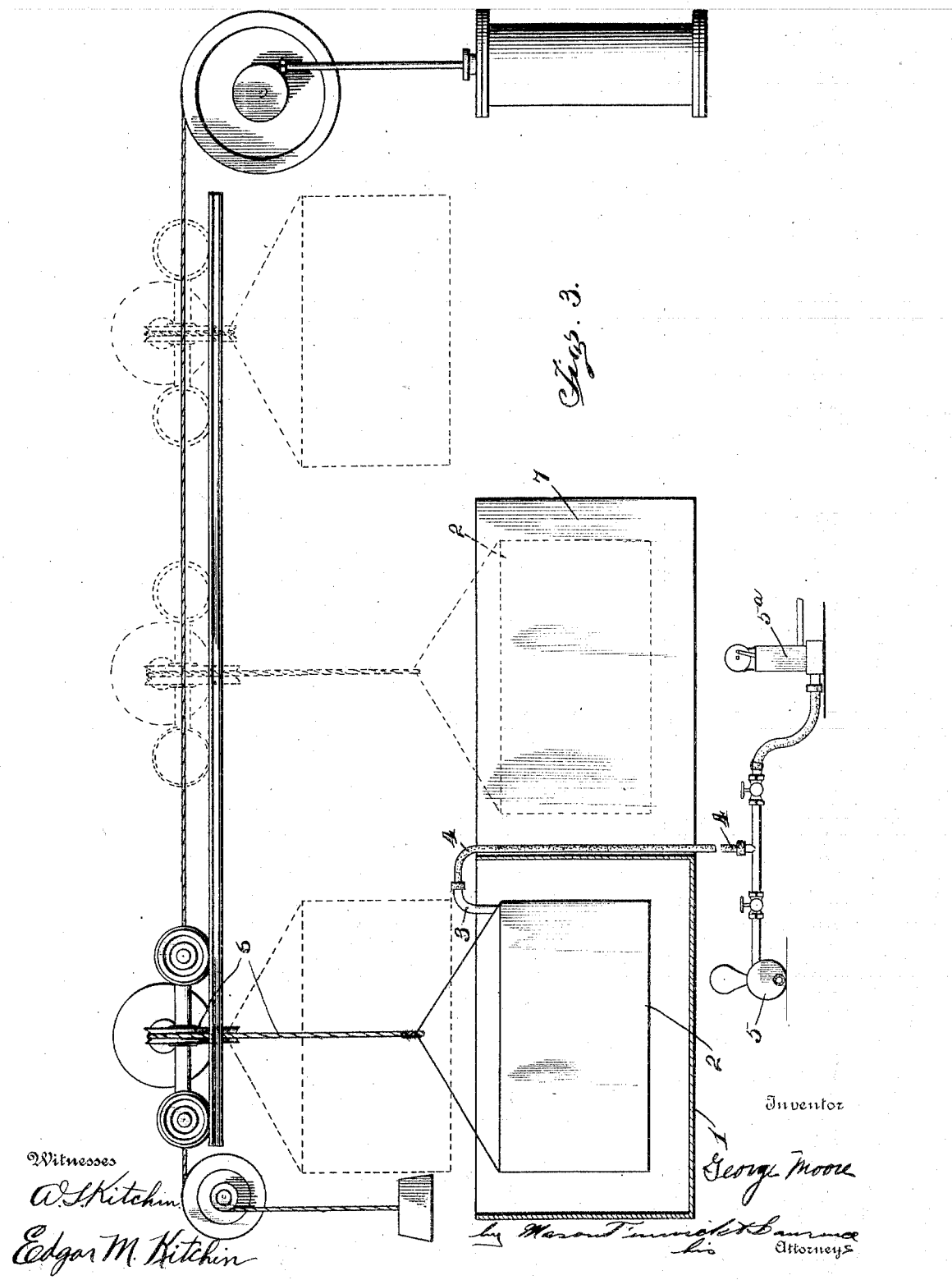

No. 764,486. Patented July 5, 1904.

UNITED STATES PATENT OFFICE.

GEORGE MOORE, OF SALT LAKE CITY, UTAH.

FILTERING PROCESS.

SPECIFICATION forming part of Letters Patent No. 764,486, dated July 5, 1904.

Application filed October 30, 1902. Renewed February 3, 1904. Serial No. 191,894. (No specimens.)

*To all whom it may concern:*

Be it known that I, GEORGE MOORE, a citizen of the United States, residing at Salt Lake City, in the county of Salt Lake and State of Utah, have invented certain new and useful Improvements in Filtering Processes; and I do hereby declare the following to be a full, clear, and exact description of the invention, such as will enable others skilled in the art to which it appertains to make and use the same.

My present invention relates to the filtration of metal-bearing slimes and the like; and it consists of certain novel processes particularly pointed out in the claims concluding this specification.

In the accompanying drawings I have illustrated one set of elements which may be employed for carrying out the present process, in which—

Figure 1 represents a longitudinal section through a tank, illustrating a filtering device therein capable of carrying out the present process. Fig. 2 represents a view in end elevation of said tank, the filtering device being indicated in dotted lines. Fig. 3 represents a diagrammatic view of elements ordinarily employed for carrying out the present process.

Although in the accompanying drawings I have disclosed a particular set of elements capable of carrying out my improved process, it will be understood that the said process may as well be carried out by any other elements capable of completing the steps to be described, the disclosure in the drawings being given as one illustration of complete means for carrying out the process.

In carrying out the process with the means disclosed in the accompanying drawings adapted particularly for use in connection with the slimes of precious metals I introduce a solution to be filtered into a suitable tank 1, in which I place a filtering device or means 2, in the present instance made up of a series of filter-plates communicating with a common discharge-tube 3. A flexible or other suitable tube 4 connects the tube 3 with any preferred form of hydraulic pump 5 and compressed-air pump $5^a$, and the filtering means 2 is permitted to remain within the tank 1 until the solid matter within the liquid being filtered has coated the walls of the filtering device to the desired thickness—say, for example, about three-quarters of an inch or more in most cases, but varying somewhat with the character of the slimes which are being handled—and then the same is lifted, as by pulley-and-cable mechanisms 6, out of and away from the tank, and the pump 5 stopped and pump $5^a$ operated so as to apply air-pressure to the back of the canvas or to pass a current of air or cleansing-current in an opposite direction to the movement of the liquid in the prior step, whereby the solid matter collected by the filtering device 2 will be discharged therefrom. However, this cleansing step of the process need not be taken until an intermediate auxiliary step has been performed, which consists in introducing the element 2, after having been coated with the solids, into a tank 7 of water, the drawing or sucking operation of pump 5 being continued while the element 2 is being subjected to the said water-bath. When this step is employed, the next succeeding is the operation just described. It will be obvious that the water-bath may be employed or not, as desired, the same being preferable when the filter is used for filtering precious ores, the said step tending to wash out the remaining metal held in solution or solvent thereof within the solids coating the filtering device.

In order to effectively discharge the incrusted slimes from the filter by the agency of compressed air, it is important that the slimes be in the form of a compact layer of requisite resistance and of sufficient thickness, because otherwise when the air-pressure is applied portions only of the slimes are blown off, thereby relieving or reducing the air-pressure and rendering it ineffective for the removal of those slimes which remain and necessitating the use of other means—such as scrapers, brushes, and washing—for the complete cleaning of the filter-surface. This difficulty is wholly overcome in my process by immersing the filter into the tank containing the slimes in suspension and depositing them in the manner described, the effect of which is to automatically deposit the slimes in a homogeneous layer, as will be readily understood. Hence when the slimes have been thus deposited to the requisite thickness the compressed air does not blow holes in the layer of slimes and only partially cleans the filter, but it strips off the entire layer of slimes and effectively cleans the filter without the use of auxiliary cleansing mechanism.

While my invention is particularly designed for the filtration of slimes bearing precious metals, it will be understood that it is applicable to the filtration of any materials substantially like or analogous for the process under consideration to such slimes.

Although I have mentioned specific elements adapted for carrying out the present process, yet it will be understood that I do not limit myself to the same, as I shall feel at liberty to employ any mechanical means for accomplishing the desired result through the steps of the process above mentioned.

The present application presents claims for my process alone, the accompanying drawings being employed solely for the purpose of indicating one complete mechanism capable of and designed for facilitating the carrying out of the process, the elements of the mechanism being claimed fully in United States Letters Patent issued to me under date of December 27, 1903, No. 748,088, upon an application filed by me on the 30th day of October, 1902, and designated by Serial No. 129,432. The details of the mechanical structure preferably employed in carrying out the present process are therefore not herein set forth in minute detail, but reference is made to the said patent for full details as to the exact construction and arrangement of the parts of the improved filter therein set forth and claimed.

Having thus fully described my invention, what I claim as new, and desire to secure by Letters Patent, is—

1. The process of filtering slimes and the like, consisting in immersing a filter in a bath containing the slimes and a fluid in which they are suspended, forcing said fluid through said filter by difference of pressure between opposite sides thereof, whereby the slimes are deposited thereon in a layer of the requisite character; removing the filter from said bath and cleaning it by air-pressure applied to the back thereof.

2. The process of filtering slimes and the like, consisting in immersing a filter in a bath containing the slimes and a fluid in which they are suspended, forcing said fluid through said filter by difference of pressure between opposite sides thereof, whereby the slimes are deposited thereon in a layer of the requisite character; removing said filter from said bath while maintaining a superior pressure on the outside thereof; introducing the same into another bath and impoverishing the slimes by forcing another fluid therethrough as aforesaid; removing the filter from said bath and subsequently cleaning it by air-pressure applied to the back of said filter.

3. The process of filtering slimes and the like, consisting in immersing a filter in a bath containing the slimes and a fluid in which they are suspended, forcing said fluid through said filter by difference of pressure on opposite sides thereof, whereby the slimes are deposited thereon in a layer of the requisite character; removing the filter from said bath while continuing said difference of pressure, and subsequently discontinuing the same.

4. A filtering process comprising submerging a filtering medium in a material to be filtered, drawing the liquid being filtered from said material through said medium until a deposit of solids is formed upon the medium, removing the medium from the material being filtered, further impoverishing the solids by a cleansing operation, and removing the solids from the medium by passing a cleansing-current through said medium.

5. A filtering process comprising submerging a filtering medium in the material to be filtered, drawing the liquid being filtered from said material through said medium, removing the medium while continuing the drawing action, passing a cleansing fluid through the medium, and then passing a cleansing-current through said medium.

6. A filtering process comprising submerging a filtering medium in a material to be filtered, drawing the liquid being filtered through said medium, removing said medium from said material, submerging the same in a cleansing liquid, removing said medium from the cleansing liquid, and cleansing the medium.

7. A filtering process comprising introducing a filtering medium into material to be filtered, drawing the liquid being filtered through the filtering medium, removing the filtering medium from said material, introducing the filtering medium into a water-bath while continuing the drawing operation, and passing a cleansing-current through said filtering medium in an opposite direction to the movement of the liquid being filtered.

8. A filtering process comprising introducing filtering means into material to be filtered, drawing the liquid being filtered through said filtering means, removing the filtering means, and introducing the filtering means into a water-bath while continuing the drawing operation, removing the same from said bath, and passing a cleansing-current through the filtering means in an opposite direction to the movement of the liquid being filtered.

9. A filtering process comprising introducing a filtering means into material to be filtered, drawing the liquid being filtered through the filtering means, removing the filtering means from said material to be filtered, subjecting the filtering means to a cleansing-bath, and passing a cleansing-current through the same in a reverse direction to the movement of the liquid being filtered.

10. A filtering process comprising submerging a filtering medium a plurality of times in a plurality of baths including the material to be filtered, effecting a drawing action through the medium while thus submerging said medium, and then cleansing the medium.

11. A filtering process comprising submerging a filtering medium in the material to be filtered, drawing the liquid being filtered through said medium, removing said medium from said material to be filtered, submerging the medium in a cleansing-bath while continuing the drawing action, and finally removing said medium from said cleansing liquid and passing a cleansing-current through the medium.

In testimony whereof I hereunto affix my signature in presence of two witnesses.

GEORGE MOORE.

Witnesses:
A. L. HOPPAUGH,
J. B. HAWKES.